United States Patent
Alomainy et al.

(10) Patent No.: US 12,507,878 B2
(45) Date of Patent: Dec. 30, 2025

(54) SYSTEM AND METHOD FOR LOCATING A MEDICAL DEVICE

(71) Applicant: Queen Mary University of London, London (GB)

(72) Inventors: Akram Hussain Mohammed Alomainy, London (GB); Mohamed Adhnan Thaha, London (GB); Ahmed Khalid Aziz, London (GB); Syeda Fizzah Jilani, London (GB)

(73) Assignee: Queen Mary University of London, London (GB)

( * ) Notice: Subject to any disclaimer, the term of this patent is extended or adjusted under 35 U.S.C. 154(b) by 150 days.

(21) Appl. No.: 18/556,286

(22) PCT Filed: Apr. 20, 2022

(86) PCT No.: PCT/EP2022/060392
§ 371 (c)(1),
(2) Date: Oct. 19, 2023

(87) PCT Pub. No.: WO2022/233600
PCT Pub. Date: Oct. 27, 2022

(65) Prior Publication Data
US 2024/0180410 A1 Jun. 6, 2024

(30) Foreign Application Priority Data
Apr. 20, 2021 (GB) ...................... 2105658

(51) Int. Cl.
*A61B 1/04* (2006.01)
*A61B 1/00* (2006.01)
(Continued)

(52) U.S. Cl.
CPC .......... *A61B 1/041* (2013.01); *A61B 1/00004* (2013.01); *A61B 5/061* (2013.01); *A61B 5/073* (2013.01)

(58) Field of Classification Search
CPC ..... A61B 1/041; A61B 1/00004; A61B 5/061; A61B 5/073; A61B 2562/162;
(Continued)

(56) References Cited

U.S. PATENT DOCUMENTS 8,435,171 B2 * 5/2013 Sholev .................. G16H 40/63
600/117
9,198,563 B2 * 12/2015 Ferren .................. A61B 1/041
(Continued)

FOREIGN PATENT DOCUMENTS

JP 2006-305695 A 11/2006

OTHER PUBLICATIONS

Barbi Martina et al, "UWB RSS-Based Localization for Capsule Endoscopy Using a Multilayer Phantom and In Vivo Measurements", Aug. 1, 2019 (Aug. 1, 2019), vol. 67, No. 8, p. 5035-5043.
(Continued)

*Primary Examiner* — Baisakhi Roy
(74) *Attorney, Agent, or Firm* — Husch Blackwell LLP

(57) ABSTRACT

A computer-implemented method for locating a medical device includes analysing a first set of signals received from a medical device at a plurality of receivers and, based at least in part on the analysing, selecting a first subset of receivers from the plurality of receivers, the first subset of receivers comprising at least three receivers, and estimating the location of the medical device.

20 Claims, 5 Drawing Sheets

(51) Int. Cl.
    *A61B 5/06*     (2006.01)
    *A61B 5/07*     (2006.01)

(58) Field of Classification Search
    CPC ... A61B 5/0084; A61B 5/0507; A61B 5/6861; A61B 5/7221; A61B 5/0077
    See application file for complete search history.

(56) References Cited

U.S. PATENT DOCUMENTS

| | | | | |
|---|---|---|---|---|
| 2009/0292174 | A1* | 11/2009 | Shigemori | A61B 5/062 600/117 |
| 2012/0041263 | A1* | 2/2012 | Sholev | A61B 90/50 600/118 |
| 2014/0051949 | A1* | 2/2014 | Old | A61B 5/0002 600/302 |
| 2017/0238839 | A1* | 8/2017 | Hyde | A61B 5/062 |
| 2021/0000346 | A1* | 1/2021 | Fitzgibbons | A61B 5/746 |

OTHER PUBLICATIONS

Oleksy Pawel et al, "Improved Wireless Capsule Endoscope Localization with Phase Detection Algorithm", 2021 Signal Processing Symposium (SPSYMPO), IEEE,Sep. 20, 2021 (Sep. 20, 2021), p. 206-211.

Garcia-Pardo Concepcion et al, "UWB Channel Characterization for Wireless Capsule Endoscopy Localization", 2020 IEEE International Conference On Communications Workshops (ICC Workshops), IEEE,Jun. 7, 2020 (Jun. 7, 2020), p. 1-6.

Barbi Martina et al, "Impact of Receivers Location on the Accuracy of Capsule Endoscope Localization", 2018 IEEE 29th Annual International Symposium On Personal, Indoor and Mobile Radio Communications (PIMRC), IEEE,Sep. 9, 2018 (Sep. 9, 2018), p. 340-344.

Trung Duc Than et al, "A Review of Localization Systems for Robotic Endoscopic Capsules", IEEE Transactions On Biomedical Engineering, IEEE, USA, vol. 59, No. 9, Sep. 1, 2012 (Sep. 1, 2012), p. 2387-2399.

Hany Umma et al, "Moving averaging method of RSSI based distance estimation for wireless capsule localization", 2016 International Conference On Medical Engineering, Health Informatics and Technology (MEDITEC), IEEE, Dec. 17, 2016 (Dec. 17, 2016), p. 1-5.

International Search Report and written opinion dated Aug. 24, 2022, issued in corresponding PCT application.

Wang Z. et al. "Review of the Wireless Capsule Transmitting and Receiving Antennas." Wireless Communications and Networks—Recent Advances, Intechopen, 2012, pp. 27-46.

Hou et al., "Design and Implementation of a High Resolution Localization System for In-vivo Capsule Endoscopy", Proceedings of the 8th International Conference on Dependable, Autonomic and Secure Computing (DASC), IEEE, Dec. 12-14, 2009, Chengdu, China, Paper Presentation.

Fan et al., "3D reconstruction of the WCE images by affine SIFT method", Proceedings of the 8th World Congress on Intelligent Control and Automation, IEEE, Jun. 21-25, 2011, Tapei, Japan: IEEE, Paper Presentation.

Thoné et al. "Design of a 2 Mbps FSK near-field transmitter for wireless capsule endoscopy." Sensors and Actuators A: Physical, vol. 156, No. 1, Nov. 2009, pp. 43-48.

Lien et al. "Magnetic control system targeted for capsule endoscopic operations in the stomach—Design, fabrication, and in vitro and ex vivo valuations." IEEE Transactions on Biomedical Engineering, vol. 59, No. 7, Jul. 2012, pp. 2068-2079.

Carpi et al. "Magnetically controllable gastrointestinal steering of video capsules." IEEE Transactions on Biomedical Engineering, vol. 58, No. 2, Feb. 2011, pp. 231-234.

Chow et al. "Implantable RF medical devices.", IEEE Microwave Magazine, vol. 14, No. 4, Jun. 2013, pp. 64-73.

Summary of Federal Communications Commission Report and Order, ET Docket No. 09-36; RM 11404, FCC 11-176; Final Rule re Additional Spectrum for the Medical Device Radiocommunication Service, 70 Fed. Reg. 4252 (Jan. 27, 2012).

Electromagnetic compatibility and Radio spectrum Matters (ERM); Wideband transmission systems; Data transmission equipment operating in the 2,4 GHZ ISM band and using wide band modulation techniques; Harmonized EN covering the essential requirements of Article 3.2 of the R&TTE Directive, European Telecommunications Standards Institute, Technical Committee Electromagnetic compatibility and Radio spectrum Matters (ERM), ETSI EN 300 328, v1.8.1, Jun. 2012.

Wahid et al., "A Localization Algorithm for Capsule Endoscopy based on Feature Point Tracking", 2016 International Conference on Medical Engineering, Health Informatics and Technology (MediTec 2016), IEEE, Dec. 17-18, 2016, Dhaka, Bangladesh, Paper Presentation.

Mateen et al. "Localization of wireless capsule endoscope: A systematic review." IEEE Sensors Journal, vol. 17, No. 5, Mar. 2017, pp. 1197-1206.

Karargyris A. et al. "Three-dimensional reconstruction of the digestive wall in capsule endoscopy videos using elastic video interpolation." IEEE Transactions on Medical Imaging, vol. 30, No. 4, Apr. 2011, pp. 957-971.

Umay I. et al. (Mar. 13, 2017), "Localization and tracking of implantable biomedical sensors." Sensors (Basel, Switzerland), vol. 17, No. 3, Mar. 2017, pp. 583-603.

\* cited by examiner

SYSTEM AND METHOD FOR LOCATING A MEDICAL DEVICE

CROSS REFERENCE

This application is a U.S. National Phase Application of International Application No. PCT/EP2022/060392 filed on 20 Apr. 2022, which in turn claims priority to UK Application No. GB2105658.5 filed 20 Apr. 2021, the disclosures of each of which are hereby incorporated by reference herein in their entireties.

TECHNICAL FIELD

The present disclosure relates to a system and method for locating a medical device such as an endoscopic capsule.

BACKGROUND

Miniaturised medical devices, such as endoscopic capsules, offer many significant benefits over traditional methods of diagnosing and treating patients. In particular, most miniaturised medical devices can be easily inserted into the human body with minimal discomfort or risk. Once inside the body, the small size of such devices offers greater versatility for performing diagnosis, drug delivery and other therapies.

To take the example of an endoscopic capsule, such an endoscopic capsule can be swallowed by a patient in the same manner as an ordinary pill. This removes the need for more involved and invasive procedures associated with traditional endoscopies, where a camera on the end of a cable is inserted into the body. A capsule endoscope typically includes a camera. As the endoscopic capsule passes through the body, in particular the digestive tract, the camera can take many thousands of images. These images can be processed and can aid in diagnosis of bowel diseases and such like.

There is often a need to locate and track the endoscopic capsule, for example once it has been inserted into or ingested by a patient.

Most current solutions for locating the endoscopic capsule depend heavily on analysis of the images being transmitted by the endoscopic capsule. Feature extraction is typically used to determine where the endoscopic capsule is in the body. This is heavily reliant on the knowledge and experience of the physician at hand and hence is prone to human error.

Some limited progress in autonomous localisation of the endoscopic capsule has been made. In particular, magnetic-based localisation, where the intensity of a magnetic field emitted by the endoscopic capsule is picked up and recorded through a large external receiving unit, has been studied. A drawback of this technology, however, is the potential for interference from other nearby devices that may be present during a procedure, as well as interference caused by prosthetic implants. To offset this variability in the quality of signals caused by external factors, it is necessary to perform the localisation procedure in a highly controlled laboratory setting. This is complex, costly and means the localisation procedures are not suitable for use in less sophisticated settings such as may be present in developing countries or where there is a shortage of suitable environments to carry out the procedure.

Even in sophisticated and controlled settings, the accuracy of such techniques is heavily dependent on the quality of the endoscopic capsule magnet and the clarity of the link between the endoscopic capsule and the receiver.

Additional problems with existing systems arise from the fact that they are unable to take into account the anatomical and physiological variations that occur between patients, which affect any communication link between the endoscopic capsule and the receiver, often to a significant extent. This results in large error margins and, ultimately, potentially unreliable data regarding the location of the capsule.

As can be seen, existing systems and methods for locating medical devices such as capsule endoscopes suffer from significant drawbacks. It would be advantageous to provide systems and methods which address one or more of these problems, in isolation or in combination.

SUMMARY

This overview introduces concepts that are described in more detail in the detailed description. It should not be used to identify essential features of the claimed subject matter, nor to limit the scope of the claimed subject matter.

According to one aspect of the present disclosure, there is provided a method for locating a medical device. The medical device may be an endoscopic capsule. Typically the method is computer-implemented.

The method comprises analysing a first set of signals received from a medical device at a plurality of receivers and, based at least in part on the analysing, selecting a first subset of receivers from the plurality of receivers, the first subset of receivers comprising at least three receivers. The method further comprises estimating the location of the medical device by performing the steps of: (a) determining, based on trilateration of respective signals of the first set of signals received by the first subset of receivers, a first estimated location of the medical device; (b) determining, based on trilateration of a second set of signals received from the medical device by the first subset of receivers, a second estimated location of the medical device; and (c) determining whether the first and second estimated locations of the medical device are within a threshold distance of one another. The estimated locations may be considered converged if they are within the threshold.

By using this disclosed method, the medical device can be located to a high degree of accuracy without any need for feature recognition or reliance on the expertise of a physician. By selecting a subset of receivers based on signal analysis to perform the localisation (trilateration) process, the likelihood that accurate localisation can be achieved rapidly is increased. By performing at least two iterations of the trilateration and then determining whether subsequent location outputs are within a threshold of one another, accuracy of the localisation can be verified simply and quickly.

The method may further comprise, if the first and second estimated locations of the medical device are within a threshold distance of one another, outputting an estimated location of the medical device based on the first and second estimated locations. This output can be, for example, at a monitor or display and may provide a physician with real-time information about the location of the medical device.

Determining the first and/or second estimated location of the medical device may be based on a least squares approximation or a most likely path approximation. These methods provide efficient and simple mechanisms for performing the trilaterations to locate the medical device.

The method may further comprise mapping the estimated location of the medical device to a location in a patient anatomy. For example, the method may comprise mapping the estimated location of the medical device to a location in a patient's colon, or elsewhere in the patient's digestive tract. This can enable the output location provided by the disclosed methods, which are initially provided in a reference frame of (i.e. relative to) the receivers, to be converted to a location in a more useful reference frame of the patient's body. From this, useful information about where the endoscopic capsule is in the body at a given time can be determined, which can facilitate the localisation and/or tracking of the endoscopic capsule as it passes through the patient.

The method may further comprise verifying that the location in the patient anatomy is a plausible location for the medical device. For example, the method may comprise comparing the indicated location in the patient anatomy to an expected location and determining whether the indicated location in the patient is within a threshold distance of the expected location. The expected location may be determined based on a model of the patient anatomy.

The disclosed methods can therefore allow a check to be carried out to determine whether the estimated location output by the disclosed methods is realistic or not. For example, if the estimated location for the medical device, once mapped to a patient anatomy, is outside the patient body or is in an area of the patient anatomy where the medical device is unlikely to be, then the output can be flagged as potentially unreliable and checked or repeated.

The method may further comprise, if the first and second estimated locations of the medical device are not within a threshold distance of one another, selecting a second subset of receivers from the plurality of receivers, the second subset of receivers comprising at least three receivers and comprising at least one receiver that was not in the first subset of receivers. The method may further comprise repeating steps (a)-(c) described above in respect of respective signals received from the medical device by the second subset of receivers.

This can be useful if, for example, the first selected subset of receivers is unable to converge on an estimated location for the endoscopic capsule, as may occur if the transmission channel between the medical device and one or more receivers of the initially selected subset is variable or particularly complex. In that case, changing to a new, second, subset of receivers can allow a new (set of) location estimate(s) for the medical device to be determined.

The method may further comprise determining, based on trilateration of a third set of signals received by the first subset of receivers, a third estimated location of the medical device. The method may further comprise determining whether the first, second and third estimated locations of the medical device are each within a threshold distance of one another.

Performing a third set of trilaterations can provide a more accurate final estimated location for the medical device and can also allow the output of an estimated location with a higher associated degree of confidence.

Analysing the first set of signals may comprise determining the quality of the signal received by each respective receiver of the plurality of receivers. Selecting the first subset of receivers may comprise selecting the receivers associated with the highest quality signals.

Determining the quality of the signal received by each respective receiver may comprise determining one or more of: a signal to noise ratio of each respective signal; an amplitude of each respective signal; a signal to interference ratio of each respective signal; a time delay parameter of each respective signal; or a fluctuation frequency of each respective signal.

Selecting the subset of receivers based on signal quality or one of the above-listed parameters can increase the likelihood of the subset being able to quickly and efficiently converge on an estimated location of the medical device.

Selecting the first subset of receivers from the plurality of receivers may be based at least in part on the relative location of the plurality of receivers. This can be used to take account of where in a patient body the medical device being located currently is. For example, if the medical device is known to be in a particular portion of the colon, then the receivers closest to that part of the colon may be selected for locating the medical device.

The delay between steps (a) and (b) described above may be 1 millisecond or less. A delay of 1 millisecond or less between iterations can advantageously result in subsequent iterations of the trilateration process being unaffected, or only minimally affected, by movement of the medical device and/or patient body.

The distance between the first and second estimated locations of the medical device may be calculated as a percentage difference. In this case, determining whether the first and second estimated locations of the medical device are within a threshold distance of one another may involve determining the percentage difference between the first and second estimated locations. The method may comprise determining whether the threshold percentage difference is 2.5% or less. That is, the threshold for determining whether or not the first and second estimated locations of the medical device are within a threshold distance may be 2.5%.

While the trilateration described above can be achieved using just three receivers, using a greater number of receivers can result in increased localisation accuracy. Optionally, between three and six receivers are used in each subset (though every subset need not necessarily have the same number of receivers). This range can provide the best balance between increased accuracy and processing complexity. Using more than six receivers increases complexity without noticeably improving accuracy, so this is less preferred, though possible.

Optionally, the first and/or second subset of receivers may comprise four receivers. Using four receivers in a subset has been found to provide an optimum balance between complexity and accuracy.

The first and second sets of signals from which the medical device location is determined may comprise image and/or video feeds transmitted by the medical device.

By using image and/or video feeds already being transmitted by the medical device to locate the device, there is no need for the device to transmit any additional signals or carry any additional equipment to enable it to be located. This is evidently advantageous in terms of reducing complexity and cost. Typically, the image or video feeds transmitted by the medical device will comprise radio signals. These signals are not affected by interference to the same extent as magnetic signals used by some existing device localisation techniques, which is a further advantage.

The trilateration of the first and second sets of signals described above may comprise performing, for each respective signal received by each receiver of the respective subset of receivers, a path loss calculation. The path loss calculation may be based, at least in part, on a first signal parameter indicative of a path loss exponent describing the rate of change in path loss of the received signal as a function of distance from the medical device. The path loss calculation may additionally or alternatively be based, at least in part, on a second signal parameter indicative of a path loss power value at a reference distance from the medical device.

The path loss calculation may take the form:

$$\text{Path Loss}(d) = \alpha + 10\beta \log_{10}(d/d_0)$$

wherein:

d is the distance from the signal source;

the path loss is the signal power loss at distance d;

$\beta$ is the first signal parameter;

$\alpha$ is the second signal parameter; and $d_0$ is a reference distance.

The method may further comprise the step of: (d) modifying the first and/or second signal parameter based on one or more known characteristics associated with a patient. The one or more known characteristics may include a body mass index, BMI, value of the patient. Use of BMI to modify the signal parameters can allow the path loss calculation to account for differences in body tissue distribution and tissue permittivity between patients. Optionally, the one or more known characteristics may include the age of the patient, which can also impact tissue distribution and permittivity.

The method may further comprise the step of: (e) repeating the path loss calculation using the modified first and/or second signal parameter. Steps (d) and/or (e) may be repeated at a rate of 50 to 80 iterations per second.

By considering patient characteristics and modifying the path loss calculation to locate the medical device accordingly, the localisation process can take account of the effect of different patient characteristics on the signal behaviour. Accordingly, the localisation method can be made adaptive in the sense that the method can adapt to suit patients of different size, weight and with different levels of fat and other tissue distribution.

The method may further comprise determining whether the modified first and/or second signal parameter is within a threshold difference of an expected value of the first and/or second signal parameter respectively. This can act as a check on modifications made to the signal parameters in the path loss calculation, ensuring that the calculation does not become unrealistic. The expected values of the first and second signal parameters can be predetermined values based on experimental data. For example, the expected range for the first signal parameter ($\beta$) may be 1.9 to 3.5. The expected range for the second signal parameter ($\alpha$) may be −25 to −35 dB. These expected ranges may themselves be updated based on patient characteristics such as BMI.

According to another aspect of the present disclosure, there is provided a data processing apparatus comprising a processor configured to perform any of the methods disclosed herein.

According to another aspect of the present disclosure, there is provided a system comprising a plurality of receivers configured to receive signals from a medical device and a data processing apparatus comprising a processor configured to perform any of the methods disclosed herein.

According to another aspect of the present disclosure, there is provided a computer program comprising instructions which, when the program is executed by a computer, cause the computer to carry out any of the methods disclosed herein.

According to another aspect of the present disclosure, there is provided a computer-readable storage medium comprising instructions which, when executed by a computer, cause the computer to carry out any of the methods disclosed herein.

According to a yet further aspect of the invention there is provided a method for the diagnosis of a disease or condition in a patient, comprising the steps of locating a medical device using any of the methods disclosed herein, generating images of the gastrointestinal tract using the medical device and analysing said images and the determined location of the medical device to provide a diagnostic indicator of whether the patient has a disease or condition and/or where a lesion, disease or condition is located. For example, the lesion, disease or condition may be cancer. The lesion, disease or condition may be polyp in the large or small intestine, stomach or oesophagus. The disease or condition may be a gastrointestinal disease, for example a gastrointestinal disease characterised by inflammation, for example Crohn's Disease, Ulcerative colitis, Indeterminate colitis or Irritable Bowel Syndrome (IBS).

The method may further comprise guiding the device to a pre-determined location of the gastrointestinal tract using the location methods disclosed herein. The device may be guided by wireless communication with a remote control activating and deactivating the locomotion device within the device.

The lesion, disease or condition may be a gastrointestinal disorder, inflammation, injury or cancer. The gastrointestinal disorder may be oral disease, oesophageal disease, gastric disease, intestinal disease or accessory digestive gland disease. Examples of gastrointestinal disorders include constipation, irritable bowel syndrome, hemorrhoids, anal fissures, perianal abscesses, anal fistulas, diarrhoea, perianal infections, diverticular diseases, colitis, colon polyps, Crohn's disease, Celiac disease, gall stones, bile duct stones, bile duct strictures, gastroesophageal reflux disease (GERD) or peptic ulcer disease (PUD).

These embodiments are merely illustrative aspects of the innumerable aspects associated with the present disclosure and should not be deemed as limiting in any manner. These and other embodiment, aspects, features and advantages of the present disclosure will become apparent from the following detailed description when taken in conjunction with the referenced figures.

BRIEF DESCRIPTION OF THE FIGURES

Illustrative implementations of the present disclosure will now be described, by way of example only, with reference to the drawings. In the drawings.

Throughout the description and the drawings, like reference numerals refer to like features. The figures are not to scale.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figure 1:
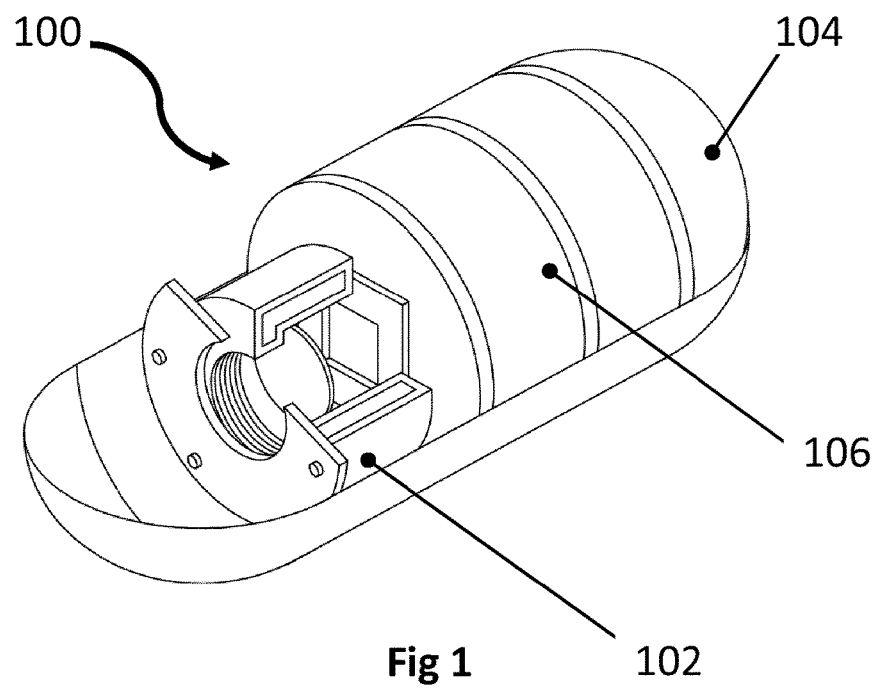
FIG. 1 shows schematically an endoscopic capsule such as can be located using the systems and methods disclosed herein.

This detailed description describes, with reference to FIG. 1, a medical device of the sort which can be located using the methods and systems disclosed herein. The description then describes, with reference to FIGS. 2 and 3, how a subset of three receivers can locate the medical device based on signals received from the medical device. An example method for locating the medical device according to the present disclosure is described with reference to FIG. 4, and an optional extension to this method is described with reference to FIG. 5. Finally, with reference to FIG. 6, the components of an example computer that can be used to implement the methods described herein are described.

The systems disclosed herein relate generally to locating a medical device, in particular a miniaturised medical device such as an endoscopic capsule. The term "miniaturised medical device" in this context is intended to mean a device which can be wholly inserted into the body and which typically travels around or through the body by virtue of its own propulsion or drive system, or as a result of the body naturally passing the device through a particular biological structure such as the digestive tract. This is in contrast to traditional larger scale medical devices such as cable-based endoscopes, which remain physically connected to the outside world during operation.

In the following example embodiments, the medical device described is an endoscopic capsule. This is, however, merely an example and other medical devices may be located using the disclosed systems and methods.

An example arrangement of such a method and system will now be described in greater detail with respect to FIGS. 1 to 5.

FIG. 1 shows an endoscopic capsule 100 such as may be located using the methods and systems disclosed herein. In this example the endoscopic capsule 100 includes imaging components, such as a camera 102 configured to capture still images and/or video. The endoscopic capsule 100 also contains a transmitter 104 configured to transmit said images and/or video to a receiver. In this example, the signal transmitted is a radio signal. The endoscopic capsule 100 further contains a power source 106, in this example a battery.

The details of the endoscopic capsule 100 are not essential and the disclosed systems and methods are suitable for locating any medical device that is able to transmit a signal to a plurality of receivers. It will be apparent, therefore, that in other examples the endoscopic capsule 100 may be configured differently and may contain more or fewer components.

In this example, the endoscopic capsule 100 is passive meaning that it is incapable of movement by itself and instead relies on the action of the digestive tract to propel it through the body. Alternatively, however, the endoscopic capsule 100 may contain an active locomotion system, which allows it to move around the body in a desired direction, for example in response to instructions from an operating controller. In some examples, the endoscopic capsule 100 may contain additional components to enable additional diagnosis, drug delivery or other therapies to be conducted.

Underlying the disclosed methods is the principle that signals emitted by the endoscopic capsule 100 can be detected by one or more receivers. This can enable the location of the endoscopic capsule 100 to be determined, as will now be explained in further detail with reference to FIGS. 2-5.

Figure 2:
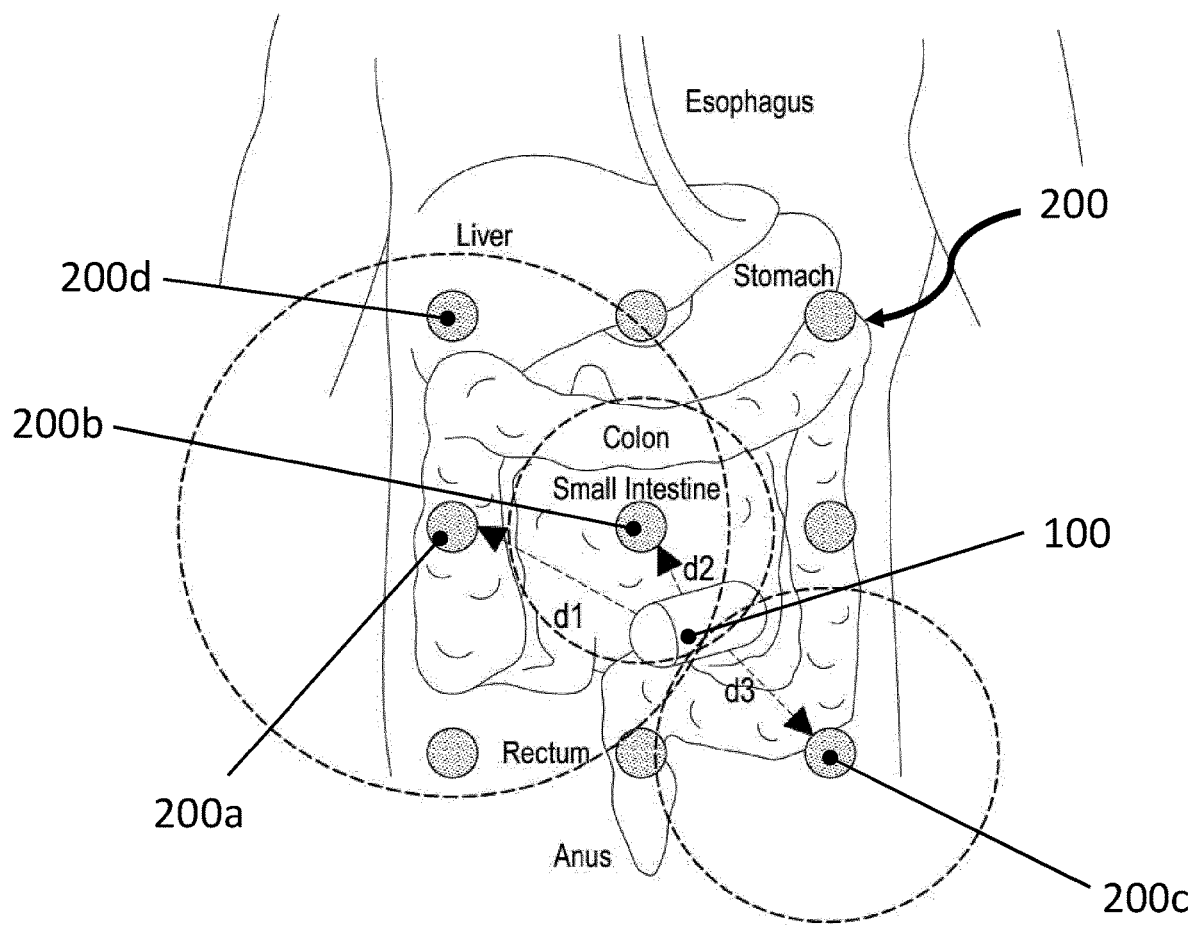
FIG. 2 shows schematically an endoscopic capsule and a plurality of receivers overlaid on a patient anatomy.

FIG. 2 shows the endoscopic capsule 100 of FIG. 1 schematically overlaid on a patient anatomy (not to scale), indicating where in the patient anatomy the endoscopic capsule 100 is currently located. In the example shown, the endoscopic capsule 100 is located in the left hand portion of the lower bowel. It will be appreciated that this is merely an example.

Also shown schematically is a plurality of receivers 200. In this example, there are nine receivers, although any suitable number of receivers may be used. There should be at least three receivers to allow for trilateration of the signals transmitted by the endoscopic capsule 100. In practice, eight receivers has been found to provide an optimum balance between versatility and complexity/cost.

In use, the receivers may be provided in any configuration around the patient anatomy being investigated. For example, if there are nine receivers as shown in FIG. 2, there may be four receivers provided at the front of the patient, two at the side (one either side), and three at the rear. In such a configuration, the patient is surrounded on all sides by at least one receiver, which can be advantageous for locating the endoscopic capsule 100.

It will be appreciated, however, that any suitable configuration can be used and that the most optimum configuration of receivers may depend on the procedure being carried out as well as the nature of the endoscopic capsule 100 and receivers. For example, if an approximate location of the endoscopic capsule 100 within the anatomy is already known, then it may be desirable to provide a higher density of receivers around that known area, rather than having the receivers spread out around the patient in the manner shown in FIG. 2.

Advantageously, the receivers may be provided in a garment which is configured to cover the area of the body being investigated when worn by the patient. It will be apparent, however, that this is optional and the receivers may be provided on or around the patient in any suitable manner and configuration. For example, the receivers may be stuck on to the patient using a temporary adhesive.

The receivers are configured to detect signals transmitted by the endoscopic capsule 100. In this example, where the endoscopic capsule 100 transmits radio signals, the receivers are therefore radio receivers, although other signals and thus other types of receiver can be used.

In the present example, a data apparatus such as a computer (not shown) is provided for determining the location of the endoscopic capsule 100 based on the signals received by the receivers. An example computer for performing this function is shown schematically in FIG. 6. The computer is configured to process the signals received by the receivers and, based on this, to locate the endoscopic capsule 100 using the methods disclosed herein. These methods will be now be described in detail.

Location of the endoscopic capsule 100 is based on trilateration of the signals received by the receivers. In particular, by using a subset of at least three receivers from the plurality of receivers 200 and trilaterating the signals received by this subset, an estimated location for the endoscopic capsule 100 can be determined. This process is shown schematically in FIG. 2 and in more detail in FIG. 3.

FIG. 2 shows how, for each receiver of a subset of receivers 200a, 200b, 200c, a distance d1-d3 can be determined based on the signal received by the respective receiver. These distances are calculated, in this example, using a path loss calculation which assesses the power of the signal received and determines, based on this and the known speed of light, an estimated distance between the receiver and the source of the signal, which in this case is the endoscopic capsule 100.

In this example, a least squares approximation is used to determine distances d1-d3 based on optimised averaged power loss values to obtain the estimated distance between each receiver and the target (transmitter) based on multiple power loss data points, although a most likely path approximation or other suitable method may also be used.

From this, each respective receiver can determine how far away the endoscopic capsule 100 is estimated to be. In the example shown in FIG. 2, processing of the signal received by receiver 200a indicates that the transmitter (i.e. the endoscopic capsule 100) is a distance d1 away from receiver 200a. Similar processing identifies that the endoscopic capsule 100 is a distance d2 away from a second receiver 200b of the subset, and further that the endoscopic capsule 100 is a distance d3 away from a third receiver 200c of the subset. Based on these distances, spheres (shown schematically in FIG. 2 as circles) can be mapped out in space, centering on the respective receivers and having a radius of d1, d2 or d3 respectively. The point where these three spheres intersect is then the estimated location for the endoscopic capsule 100, as shown in FIG. 2.

Figure 3:
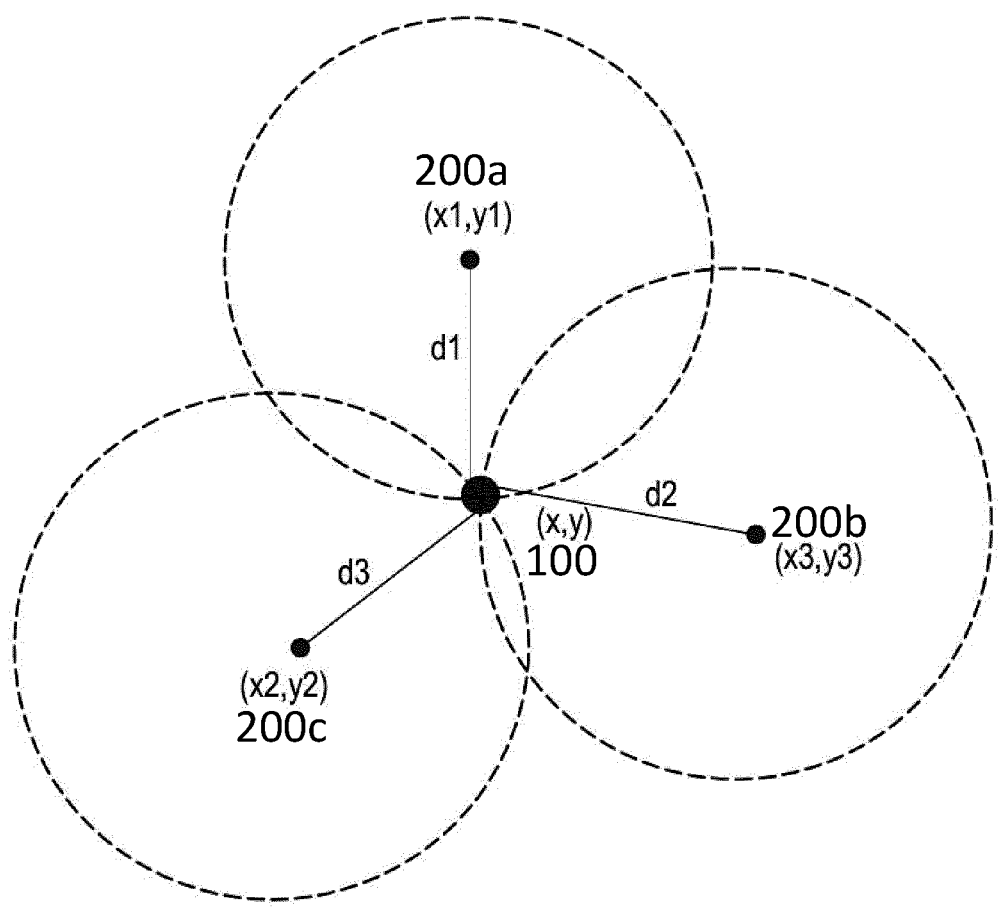
FIG. 3 shows schematically how the location of the endoscopic capsule may be determined on the basis of signals received by a subset of three receivers.

This trilateration process is shown in further detail in FIG. 3. Here, a similar subset of three receivers 200a, 200b, 200c is shown again, as are distances d1, d2, d3 which are the estimated distances between each respective receiver and the endoscopic capsule 100 transmitting the signals. The locations of the receivers 200a, 200b, 200c is known ((x1,y1); (x2,y2); (x3,y3) respectively). From this, the location of the endoscopic capsule 100 (x,y) can be determined.

In the present example, determining the distance between a given receiver and the transmitting endoscopic capsule 100 is based on performing, for each respective signal received by each receiver of the subset, a path loss calculation. In the present example the path loss calculation takes the following form:

Path Loss$(d) = \alpha + 10\beta \log_{10}(d/d_0)$ where:
  d is the distance from the signal source (i.e. the endoscopic capsule 100) to a respective receiver;
  $\beta$ is a first signal parameter;
  $\alpha$ is a second signal parameter; and
  $d_0$ is a reference distance.

In this example, $\beta$ is indicative of a path loss exponent describing the rate of change in path loss of the received signal as a function of distance from the signal source. In this example, $\alpha$ is indicative of a path loss power value at a reference distance from the medical device. In the present example the reference distance, $d_0$ is 30 cm. In the present example, a is initially set at a value between −25 to −35 dB and $\beta$ is initially set at a value between 1.9 to 3.5. As will be explained in more detail below in relation to FIG. 5, however, $\alpha$ and $\beta$ may be modified iteratively based on various factors to assist in locating the endoscopic capsule 100.

In the above calculation, the path loss is the signal power loss at distance d. This can be derived from the power of the signal measured at the respective receiver and the known power of the signal emanating from the transmitter 104 at the endoscopic capsule 100. Based on this, and having set $\alpha$ and $\beta$ to an appropriate value, the above calculation can be solved for d to determine an estimated distance between each receiver and the endoscopic capsule 100.

By solving the above path loss calculation in this manner for each receiver of the subset 200a, 200b, 200c, values for d1, d2 and d3 as shown in FIGS. 2 and 3 can be determined. From this, trilateration techniques can be used as described above to determine an estimated location for the endoscopic capsule 100. Whilst the example shown uses three receivers, and thus the trilateration is based on determining the intersection point of three spheres, more receivers can be used. Increasing the number of receivers will enhance the accuracy of the calculation of the intersection of spheres and thereby provide increased confidence in the estimated location of the endoscopic capsule 100. Preferably, between three and five receivers are used, which provides a good balance between complexity and accuracy. More preferably, four receivers are used which provides an optimum balance between complexity and accuracy. However, in principle any number of receivers can be used and some circumstances may call for more than five receivers.

By using the above trilateration-based approach, an estimated location of the endoscopic capsule 100 can be determined.

Nevertheless, the inventors have identified that, even when using the above-described approaches, precise localisation of the endoscopic capsule 100 remains difficult because of the varying nature of the transmission channel affecting the signals transmitted by the endoscopic capsule 100. In particular, the human body is a strongly dielectric medium which introduces significant noise and variability into the signal. Additionally, even on small timescales the human body is a dynamic environment which is always moving and in flux, for example due to heartbeats, small movements of organs and muscle contractions. Methods for addressing these issues will now be described with reference to FIG. 4.

Figure 4:
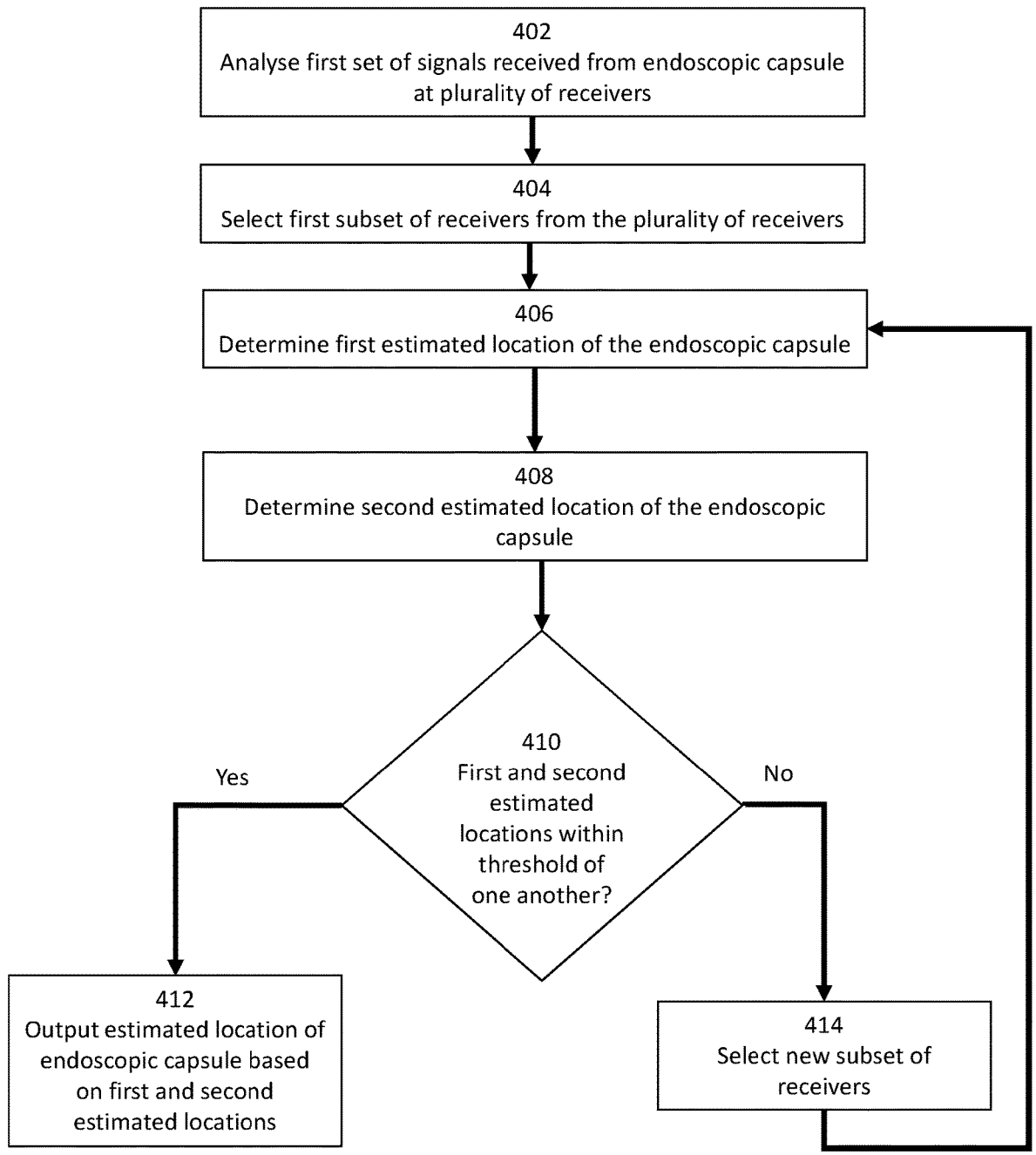
FIG. 4 shows the steps of an example method for locating the endoscopic capsule.

FIG. 4 shows an improved method for locating the endoscopic capsule 100. The method may be implemented by a data apparatus such as a computer, as noted above.

At block 402, a first set of signals received from the endoscopic capsule 100 at the plurality of receivers 200 is processed and analysed. Typically the first set of signals is generated by a single broadcast (one to many) signal which is emitted by the endoscopic capsule 100 and can be received by any suitably configured receiver, although in other examples the first set of signals may consist of a set of targeted (unicast, one to one) transmissions from the endoscopic capsule 100 to each specific receiver.

In this example, analysing the first set of signals comprises determining the quality of the signal received by each respective receiver of the plurality of receivers 200. This involves determining one or more of: a signal to noise ratio of each respective signal; an amplitude of each respective signal; a signal to interference ratio of each respective signal; a time delay parameter of each respective signal; or a fluctuation frequency of each respective signal.

Analysing the signal received by each respective receiver of the plurality of receivers 200 in this manner allows the receivers to be ranked from best to worst in terms of the signal quality they have received. Based on this signal analysis, at block 404 a first subset of receivers is selected from the plurality of receivers 200. In this example the subset of receivers comprises three receivers 200a, 200b, 200c as shown in the previous Figures, however in other examples more receivers can be selected. In this example the plurality of receivers 200 from which the receivers 200a, 200b, 200c are selected comprises nine receivers, although the plurality of receivers 200 may comprise more or fewer receivers than this.

Performing this pre-selection step increases the likelihood that a reliable set of transmitter-receiver channels is being used to locate the endoscopic capsule 100, such that the location of the endoscopic capsule 100 can be determined more quickly and accurately. Once the subset of receivers 200a, 200b, 200c has been selected, the location of the endoscopic capsule 100 is determined by performing blocks 406 and 408.

At block 406, a first estimated location of the endoscopic capsule 100 is determined based on trilateration of the respective signals of the first set of signals received by the selected subset of receivers 200a, 200b, 200c. In the present example, the determination at block 406 involves solving, for each receiver of the selected subset 200a, 200b, 200c, a path loss calculation as discussed in relation to FIG. 3. From this, trilateration allows an estimate location of the endoscopic capsule 100 to be determined, as also discussed in relation to FIG. 3.

Given the variability in signals received from a endoscopic capsule 100 inside the body, the process is then repeated with a new set of signals at block 408 to verify the determined location. Specifically, a second set of signals is received by the selected subset of receivers 200a, 200b, 200c, and the path loss calculation and trilateration processes are repeated for the new set of signals for each of the selected receivers. This results in determination of a second estimated location of the medical device.

At block 410, a check is performed whereby the first and second estimated locations (determined at blocks 406 and 408 respectively) are compared. It is determined whether the first and second estimated locations of the endoscopic capsule 100 are within a threshold distance of one another. The threshold is predetermined and may be an absolute value, for example 1 mm. Alternatively, the threshold may be calculated as a percentage difference or "delta". Where a percentage difference is used, determining whether the first and second estimated locations of the medical device are within a threshold distance of one another involves determining the percentage difference between the first and second estimated locations. A suitable percentage difference threshold is 2.5% or less. That is, if the first and second estimated locations of the medical device are within 2.5% of one another, then they are deemed to be within the threshold.

If the first and second estimated locations are within the threshold of one another, then the location estimates are deemed to be converged and the location of the endoscopic capsule 100 has been determined. The process then optionally follows the "yes" arrow to block 412. At block 412, the estimated location of the endoscopic capsule 100 is output. In the present example, the output estimated location of the endoscopic capsule 100 location is calculated as an average of the first and second estimated locations determined at blocks 406 and 408. Output of the estimated endoscopic capsule 100 location can involve, for example, reporting the location to a display for presenting to an operator, saving the determined location to memory or reporting the determined location to a server.

If the first and second estimated locations are determined, at block 410, to not be within the threshold of one another, then the location estimates are deemed not to be converged. This can itself be reported as an output in the same manner just described. The process can then optionally repeat, so as to attempt to find a converged location estimate. Optionally, this can be performed using a new set of signals received by the same initially selected subset of receivers 200a, 200b, 200c.

Alternatively, the process can be repeated using a different subset of receivers, which is the approach shown in FIG. 4. Under this approach, when the first and second estimated locations do not converge at block 410, the process follows the "no" arrow and a new subset of receivers is selected from the plurality of receivers 200, at block 414.

The new subset of receivers selected at block 414 in this example again contains three receivers from the plurality of receivers 200, however at least one receiver selected at block 414 was not in the first subset of receivers initially selected at block 404. In this example, the subset of receivers selected at block 414 includes receivers 200a, 200b and 200d shown in FIG. 2. It will be appreciated that any reconfiguration of the subset can be made at block 414, as long as there are at least three receivers in the new subset and at least one receiver was not present in the previous subset. Advantageously, the signal quality assessments performed at block 402 can be used to inform which receiver(s) from the first subset to omit when selecting the second subset at block 414. That is, selection of the new subset of receivers at block 414 can be based on the signal analysis performed at block 402. In one example, selecting the new subset of receivers at block 414 comprises omitting the receiver of the first subset (selected at block 404) which had the lowest quality signal as determined at block 402. In another example, the receiver which had the best quality signal, as determined at block 402, is retained and all other receivers in the initial subset are replaced.

Once the new, second subset of receivers 200a, 200b, 200d has been selected at block 414, the process returns to block 406 and repeats. In other words, first and second estimated locations for the endoscopic capsule 100 are determined using signals received by the second subset of receivers 200a, 200b, 200d. It is then determined whether these new estimated locations of the endoscopic capsule 100 converge, i.e. are within a threshold of another.

This process then repeats as needed, with new subsets of receivers being selected until a subset of receivers is able to converge, at block 410, on a location of the endoscopic capsule 100.

The above described method provides an efficient mechanism for determining the location of the endoscopic capsule 100 despite the difficulties in performing signal analysis in and around the human body. In particular, the pre-selecting step performed at blocks 402 and 404 acts as an initial filter to select the most promising subset of receivers. If this subset is unable to converge on an estimated location for the endoscopic capsule 100, then a new subset is selected and so on until a subset is able to converge. In practice, the iterations can be performed rapidly, with the delay between blocks 406 and 408 being on the order of 1 millisecond or less. This has the advantage of allowing rapid localisation of the endoscopic capsule 100, even when switching receiver subsets between calculations. Determining the endoscopic capsule 100 location at this iteration speed also negates the effect of any macroscopic movements of the body on the location calculation, increasing accuracy.

It will be apparent that the method of FIG. 4 can be adapted as desired based on the procedure and circumstances at hand. In particular, the number of opportunities which each subset of receivers has to converge on an estimated location can be varied. For example, while FIG. 4 shows each subset only getting one opportunity to converge (at block 410) before a new subset is selected (at block 414), the requirements for convergence can be made more "lenient" than this and each subset of receivers can be allowed a greater number of iterations if desired. This can advantageously increase the likelihood that the process is able to converge on an estimated location quickly and reduces the need for switching subsets.

On the other hand, other requirements for convergence can be made more "strict" if desired to improve accuracy, for example by increasing the number of location estimates which must be within a threshold for the location estimates to be considered as converged. In particular, while the process of FIG. 4 has each subset of receivers determining two estimated locations for the endoscopic capsule 100 (at blocks 406 and 408) and then comparing these, this is merely an example and each subset can generate and compare more than two estimated locations. As the number of estimated locations generated increases, the number of estimates that must be within a threshold of one another can also be increased correspondingly. It will be appreciated that the greater the number of estimated locations that must converge, the more accurate the process becomes, although this comes at the cost of making it less likely that the process is able to converge on an estimated location quickly.

In practice, it has been found that requiring each subset of receivers to determine four estimated locations for the endoscopic capsule 100 which are convergent provides an optimum balance between ensuring accuracy whilst ensuring a reasonable practicable level of efficiency and speed. Some circumstances may call for more than four estimates to be determined. The inventors have found that requiring a range of four to eight location calculations to converge provides a good balance between speed and accuracy.

Despite the effectiveness of the above-described method for locating the endoscopic capsule 100, in some circumstances the process may still struggle to converge on an agreed estimated location of the endoscopic capsule 100 even after multiple subsets of receiver combinations have been tried. This may occur, for example, where the endoscopic capsule 100 is in a particularly "noisy" area of the body. Further, this may occur if the path loss calculations being performed for each capsule-receiver link are poorly optimised to account for patient characteristics such as body mass index, BMI, which can significantly affect the characteristics of the signals.

An extension of the method which can be employed in such circumstances will now be described with reference to FIG. 5. This method may be used if the process of FIG. 4 has failed to converge, at block 410, on an estimated location after a predetermined number of attempts using different receiver subsets or iterations. In an example, the predetermined number of attempts may be three. That is, after three different receiver combinations has been tried without success, the method of FIG. 4 will proceed to the method of FIG. 5. This has been found to provide a good balance between speed and accuracy.

Figure 5:
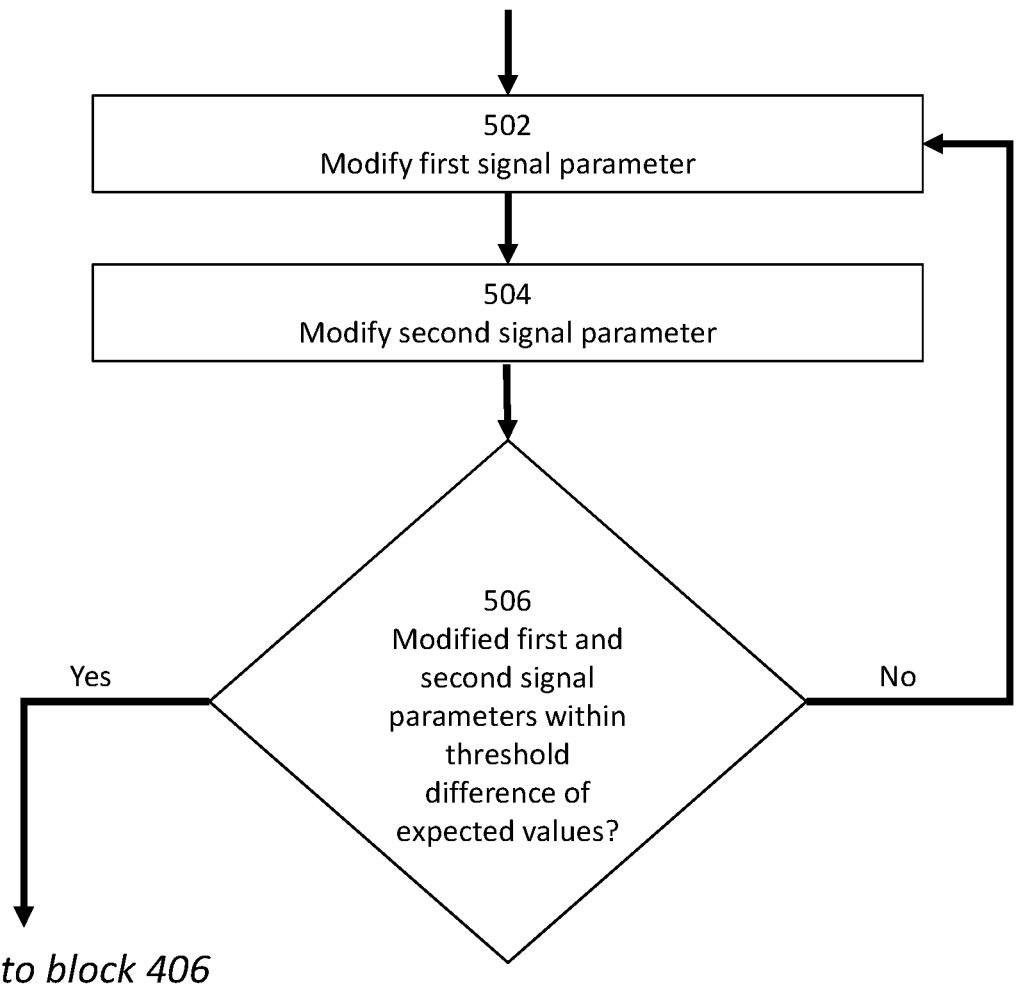
FIG. 5 shows the steps of an optional extension to the method of FIG. 4.

Turning to FIG. 5, at block 502 the first signal parameter, $\beta$, which was used in the path loss calculations used to determine the endoscopic capsule 100 position at steps 406 and 408, is modified. In this example, $\beta$ is modified based on the BMI of the patient in which the endoscopic capsule 100 is located. $\beta$ may additionally or alternatively be modified based on any other patient characteristic which has an impact on the behaviour of signals emitted from the endoscopic capsule 100. For example, age and/or tissue density may be factored in.

In this example, the method then proceeds to block 504 where the second signal parameter, $\alpha$ is similarly modified based on one or more patient characteristics. In this example, $\alpha$ is also modified based on the patient BMI however, as for $\beta$, $\alpha$ may additionally or alternatively be modified based on any other relevant patient characteristic.

At block 506, an optional check is performed to ensure that the modified values of $\alpha$ and $\beta$ are realistic, in other words that they are within a threshold difference of an expected value respectively. In this example the threshold checks that $\alpha$ is within the range −25 to −35 dB and $\beta$ is within the rage 1.9 to 3.5, however in other examples other ranges may be used.

If a "no" determination is made at block 506, indicating that the modified values for $\alpha$ and $\beta$ are not realistic, then the method returns to block 502 and new values for these parameters are chosen. If a "yes" determination is made at block 506, indicating that the modified values for $\alpha$ and $\beta$ are realistic, then the method returns to block 406 of FIG. 4 and the location determination is repeated using the modified values for $\alpha$ and $\beta$. In this way, the location calculation can be made adaptive such that it can take account of specific patient characteristics such as BMI.

It will be appreciated that the methods of FIGS. 4 and 5 can continue to loop into one another in this manner until the endoscopic capsule 100 is successfully located. In other words, if, after modifying $\alpha$ and $\beta$, the method of FIG. 4 still returns a "no" determination at block 410, then the method can again return to block 502 and $\alpha$ and $\beta$ can be yet further modified. In this way, the method is both iterative and adaptive. In practice, these iterations can be performed very quickly such that the endoscopic capsule 100 can be located in a short time period. In an example, iterations of blocks 502 and 504 are performed at a rate of 50 to 80 iterations per second.

For simplicity, FIG. 5 has been described in such a way that both $\alpha$ and $\beta$ are modified. However, it will be appreciated that this is not essential and that in other examples the parameters may be modified independently, for example only one of these parameters may be modified. The inventors have found that BMI often has a greater impact on β than on α. Accordingly, in one advantageous example the method of FIG. 5 at first only modifies β, in other words block 504 is skipped. If the method cannot converge on an estimated location for the endoscopic capsule 100 after a predetermined number of attempts after modifying β, then α can be modified as well. It will be appreciated that any combination of modifications of α and β can be made.

Figure 6:
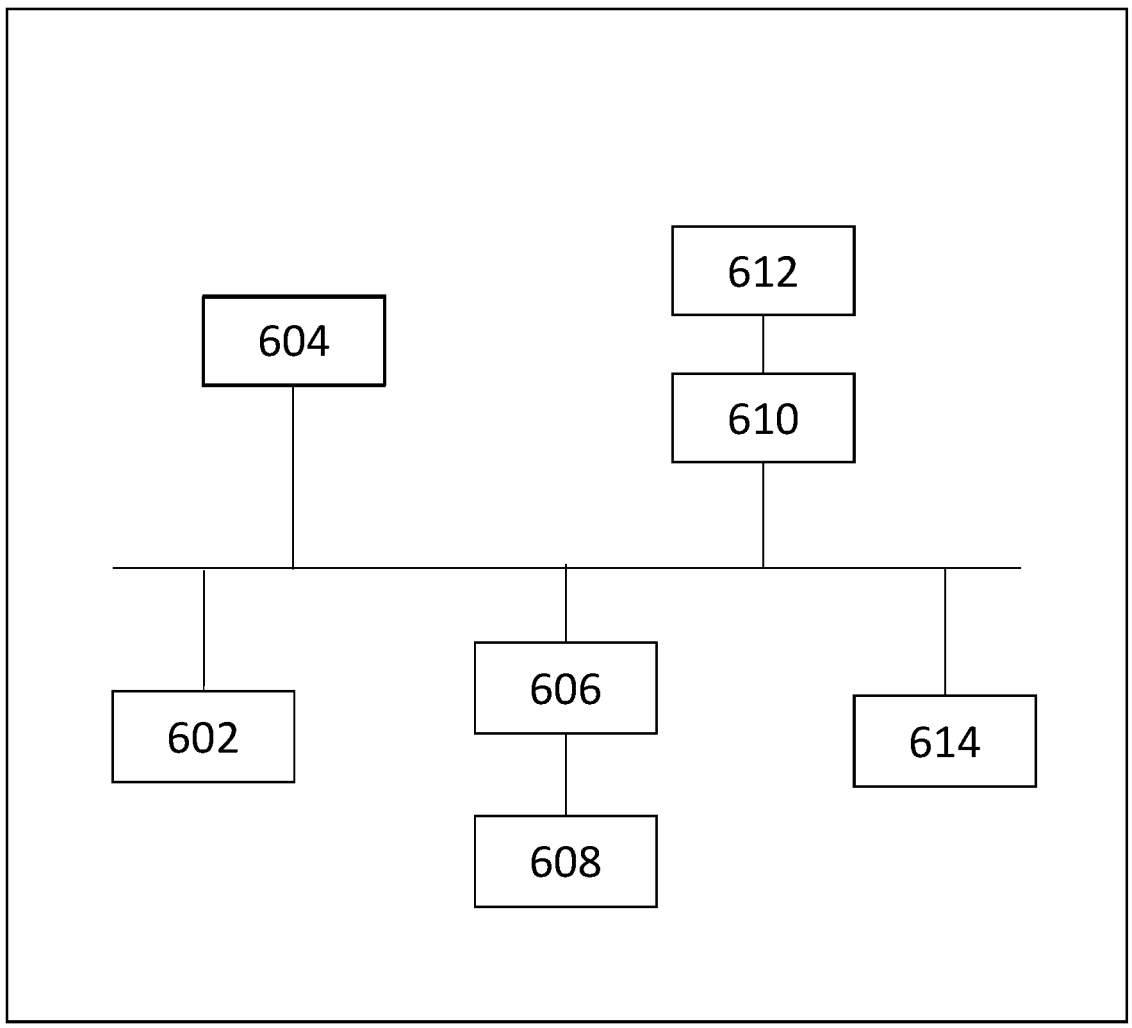
FIG. 6 shows the components of an example computer apparatus that can be used to implement the methods described herein.

Turning finally to FIG. 6, FIG. 6 shows a schematic and simplified representation of a computer apparatus 600 which can be used to perform the methods described herein, either alone, in combination with other computer apparatuses or as part of a "cloud" computing arrangement.

The computer apparatus 600 comprises various data processing resources such as a processor 602 (in particular, a hardware processor) coupled to a central bus structure. Also connected to the bus structure are further data processing resources such as memory 604. A display adapter 606 connects a display device 608 to the bus structure. One or more user-input device adapters 610 connect a user-input device 612, such as a keyboard and/or a mouse to the bus structure. One or more communications adapters 614 are also connected to the bus structure to provide connections to other computer systems 600 and other networks.

In operation, the processor 602 of computer system 600 executes a computer program comprising computer-executable instructions that may be stored in memory 604. When executed, the computer-executable instructions may cause the computer system 600 to perform one or more of the methods described herein. The results of the processing performed may be displayed to a user via the display adapter 606 and display device 608. User inputs for controlling the operation of the computer system 600 may be received via the user-input device adapters 610 from the user-input devices 612.

It will be apparent that some features of computer system 600 shown in FIG. 6 may be absent in certain cases. For example, one or more of the plurality of computer apparatuses 600 may have no need for display adapter 606 or display device 608. This may be the case, for example, for particular server-side computer apparatuses 600 which are used only for their processing capabilities and do not need to display information to users. Similarly, user input device adapter 610 and user input device 612 may not be required. In its simplest form, computer apparatus 600 comprises processor 602 and memory 604.

The above detailed description describes a variety of example arrangements for and methods of locating a medical device such as an endoscopic capsule 100. However, the described arrangements and methods are merely exemplary, and it will be appreciated by a person skilled in the art that various modifications can be made without departing from the scope of the appended claims. Some of these modifications will now be briefly described, however this list of modifications is not to be considered as exhaustive, and other modifications will be apparent to a person skilled in the art.

The above description and accompanying figures have focused on locating an endoscopic capsule 100. However, this is merely an example and the disclosed systems and methods can be used to locate any suitable medical device. Other example suitable devices include radio-opaque pellets used for diagnosis.

Each subset of receivers may comprise any suitable number of receivers as discussed above. Further, each subset of receivers may perform any suitable number of iterations, as required in any given situation. In particular, the above description gives the example of the first subset of receivers performing two iterations, that is determining the location of the medical device twice (at blocks 406 and 408) and then determining whether the two measurements are within a threshold (at block 410). It will be apparent that the number of iterations can, however, be increased. Likewise, subsequent subsets of receivers which determine the location of the medical device can also perform any suitable number of iterations.

More generally, it should be appreciated that the number of steps shown in the figures is not intended to be limiting. Steps may be repeated as often as necessary and certain steps may be omitted.

The disclosed systems and methods can be used to locate medical devices used in both humans and non-human animals.

The computer apparatus discussed above may be a local computer or a server. It may be a standalone element or may be part of existing computer hardware for use in an imaging laboratory. The apparatus may be linked to a display, such as a screen, to display the determined location of the endoscopic capsule 100 to an operator. The computer may be configured to map the determined location to a model of a patient and to display the location of the endoscopic capsule 100 overlaid on an image or model of the patient on the screen. The model may be two or three dimensional. A physician may be able to interact with the displayed image or model to further explore the precise location of the endoscopic capsule 100 within the patient.

While various specific combinations of components and method steps have been described, these are merely examples. Components and method steps may be combined in any suitable arrangement or combination. Components and method steps may also be omitted to leave any suitable combination of components or method steps.

The described methods may be implemented using computer executable instructions. A computer program product or computer readable medium may comprise or store the computer executable instructions. The computer program product or computer readable medium may comprise a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). A computer program may comprise the computer executable instructions. The computer readable medium may be a tangible or non-transitory computer readable medium. The term "computer readable" encompasses "machine readable".

The singular terms "a" and "an" should not be taken to mean "one and only one". Rather, they should be taken to mean "at least one" or "one or more" unless stated otherwise. The word "comprising" and its derivatives including "comprises" and "comprise" include each of the stated features, but does not exclude the inclusion of one or more further features.

The above implementations have been described by way of example only, and the described implementations are to be considered in all respects only as illustrative and not restrictive. It will be appreciated that variations of the described implementations may be made without departing from the scope of the disclosure. It will also be apparent that there are many variations that have not been described, but that fall within the scope of the appended claims.

The invention claimed is:

1. A computer-implemented method for locating a medical device, comprising the steps of:
   analysing a first set of signals received from a medical device at a plurality of receivers;
   based at least in part on the analysing of the first set of signals, selecting a first subset of receivers from the plurality of receivers, the first subset of receivers comprising at least three receivers; and
   estimating the location of the medical device by performing the steps of:
   (a) determining, based on trilateration of respective signals of the first set of signals received by the first subset of receivers, a first estimated location of the medical device;
   (b) determining, based on trilateration of a second set of signals received from the medical device by the first subset of receivers, a second estimated location of the medical device;
   (c) determining whether the first and second estimated locations of the medical device are within a threshold distance of one another; and
   (d) based on an output of determining whether the first and second estimated locations of the medical device are within a threshold distance of one another, verifying the accuracy of the first and second estimated locations.

2. The computer-implemented method of claim 1, further comprising:
   if the first and second estimated locations of the medical device are within the threshold distance of one another, outputting an estimated location of the medical device based on the first and second estimated locations.

3. The computer-implemented method of claim 2, further comprising the step of mapping the estimated location of the medical device to a location in a patient anatomy.

4. The computer-implemented method of claim 3, further comprising the step of verifying that the location in the patient anatomy is a plausible location for the medical device.

5. The computer-implemented method of claim 1, wherein at least one of the steps of determining the first and second estimated locations is based on a least squares approximation or a most likely path approximation.

6. The computer-implemented method of claim 1, further comprising the steps of:
   if the first and second estimated locations of the medical device are not within the threshold distance of one another, selecting a second subset of receivers from the plurality of receivers, the second subset of receivers comprising at least three receivers and comprising at least one receiver that was not in the first subset of receivers; and
   repeating steps (a)-(d) in respect of respective signals received from the medical device by the second subset of receivers.

7. The computer-implemented method of claim 6, wherein at least one of the first and second subsets of receivers comprises four receivers.

8. The computer-implemented method of claim 6, wherein trilateration of the first and second sets of signals comprises:
   performing, for a respective signal received by each receiver of a respective subset of receivers, a path loss calculation, wherein the path loss calculation is based, at least in part, on at least one of:
   a first signal parameter indicative of a path loss exponent describing a rate of change in path loss of the respective signal as a function of distance from the medical device; and
   a second signal parameter indicative of a path loss power value at a reference distance from the medical device.

9. The computer-implemented method of claim 8, further comprising the steps of:
   (e) modifying at least one of the first and second signal parameters based on at least one known characteristic associated with a patient; and
   (f) repeating the path loss calculation using at least one of the modified first and second signal parameters.

10. The computer-implemented method of claim 9, wherein the at least one known characteristic comprises a body mass index value of the patient.

11. The computer-implemented method of claim 9, further comprising:
    determining whether at least one of the modified first and second signal parameters is within a threshold difference of an expected value of the respective signal parameter.

12. The computer-implemented method of claim 9, wherein steps (e) and (f) are repeated at a rate of 50 to 80 iterations per second.

13. The computer-implemented method of claim 1, further comprising the steps of:
    determining, based on trilateration of a third set of signals received by the first subset of receivers, a third estimated location of the medical device; and
    determining whether the first, second and third estimated locations of the medical device are each within the threshold distance of one another.

14. The computer-implemented method of claim 1, wherein the step of analysing the first set of signals comprises determining a quality of a respective signal received by each respective receiver of the plurality of receivers, and wherein the steps of selecting the first subset of receivers comprises selecting the at least three receivers associated with the respective signals having the highest quality.

15. The computer-implemented method of claim 14, wherein the step of determining the quality of each respective signal received by each respective receiver comprises determining at least one of:
    a signal to noise ratio of each respective signal;
    an amplitude of each respective signal;
    a signal to interference ratio of each respective signal;
    a time delay parameter of each respective signal; and
    a fluctuation frequency of each respective signal.

16. The computer-implemented method of claim 1, wherein the step of selecting the first subset of receivers from the plurality of receivers is based at least in part on a relative location of the plurality of receivers.

17. The computer-implemented method of claim 1, wherein a delay between steps (a) and (b) is 1 millisecond or less.

18. The computer-implemented method of claim 1, wherein a distance between the first and second estimated locations of the medical device is calculated as an estimated percentage difference, and wherein the threshold distance as a threshold percentage difference is 2.5%.

19. A non-transitory computer-readable storage medium comprising instructions which, when executed by a computer, cause the computer to carry out the method of claim 1.

20. A method for the diagnosis of a disease, condition or lesion in a patient, comprising the steps of:
locating a medical device using the computer-implemented method of claim 1;
generating images of the gastrointestinal tract using the medical device; and
analysing said images and the determined location of the medical device to provide a diagnostic indicator of at least one of:
whether the patient has a disease or condition; and
where a lesion, disease or condition is located.

* * * * *